Oct. 26, 1965 J. W. PARKS ETAL 3,213,795
FLUID HANDLING SYSTEM
Filed July 31, 1963

INVENTOR.
JOHN W. PARKS
FRANCIS R. WAGY
BY
Charles M. Kaplan
ATTORNEY.

3,213,795
FLUID HANDLING SYSTEM
John W. Parks and Francis R. Wagy, Overland Park, Kans., assignors to Union Tank Car Company, a corporation of New Jersey
Filed July 31, 1963, Ser. No. 298,961
11 Claims. (Cl. 103—35)

This invention relates to fluid pressure sensitive systems, and more particularly to systems for controlling fluid handling machinery.

The invention is especially suited to systems in which the response of control instruments is determined by the rate of flow of a fluid. In systems for controlling the flow of large quantities of liquid, such as water, sewage, crude oil, etc., the liquid handling equipment is often controlled by instruments actuated by gas pressures which are proportional to the rate of flow of the liquid.

A common method of producing a gas pressure proportional to the flow of sewage involves flowing the sewage into a wet well and simultaneously forcing air through a bubbler tube whose outlet is immersed in the sewage; this produces a back pressure in the bubbler tube proportional to the sewage level in the tank. By connecting a branch conduit from the bubbler tube to a gas pressure sensitive instrument, such as a water rheostat, the response of the instrument can be made proportional to the rate of flow of the sewage. The instrument can then control machinery for handling the sewage in proportion to the sewage rate of flow. Occasionally, temporary surges of sewage flow cause the sewage level in the tank to greatly exceed that encountered at ordinary flow rates. Since the pressure transmitted to the control instrument is proportional to the sewage level in the tank, these surges could cause an extraordinarily high pressure on the control instrument.

Control instruments such as water rheostats are relatively expensive and sensitive to contamination. For reasons of economy, the size of such devices or the operating characteristics of the machinery which they control should be determined by the normal sewage flow rate. Therefore, exposing water rheostats to unusually high gas pressures caused by extraordinary increases in sewage flow could cause temporary malfunctioning or permanent damage. Also extraordinarily high pressure could cause such instruments to require extraordinary functions of the controlled machinery and this would harm the machinery if its operating limits were exceeded.

In one attempt to solve this problem, a gas pressure regulating valve was placed in a bubbler tube between an end connected to an air compressor and an end immersed in sewage in a tank; the valve stopped air flow through the bubbler tube and through a branch conduit connected to a water rheostat when the pressure exceeded a safe value. However, compression of the then stagnant air in the bubbler tube caused by rapidly rising sewage, and dissolving of the stagnant air in the sewage, caused the stagnant air in the bubbler tube to recede and thus allow entry of sewage. Since sewage ordinarily contains gelatinous semi-solids, its entrance into the bubbler tube often clogged the tube and thus caused malfunctioning of the system. Another disadvantage of this solution to the problem is that when the regulating valve stops air flow, there is no longer a steady stream of compressed air sweeping everything ahead of it through the bubbler tube. Since sewage often contains corrosive gases such as hydrogen sulfide, the corrosive gases could then diffuse through the stagnant air in the bubbler tube until they reach the valve or water rheostat, and contact with corrosive gases is harmful to such instruments.

At all times this invention provides a constant flow of compressed air through the bubbler tube into the sewage, and thus prevents reverse flow of corrosive gases or entry of clogging solids into the bubbler tube, while simultaneously shielding the water rheostat from pressures exceeding predetermined safe values. Furthermore, the signal from the water rheostat to the controlled machinery is stabilized at a maximum level safe for the machinery even though the pressure in the bubbler tube exceeds a maximum safe value during surges in the sewage flow rate. During such periods of excessive pressure, the water rheostat continuously senses whether the pressure in the bubbler tube has returned to a safe value. The signal from the water rheostat remains stabilized while the surge continues, and when the surge passes, thus lowering the pressure in the bubbler tube to a safe value, the signal from the water rheostat will again become proportional to the rate of sewage flow.

Accordingly, it is an object of the invention to provide new and improved means for stabilizing the response of gas pressure sensitive control instruments.

Another object is to provide an improved system for pumping sewage.

Another object is to provide a pressure sensitive control system that has an output proportional to fluid pressure up to a predetermined level and above such level has a stabilized output, wherein the system requires only one pressure sensitive valve.

Another object is to provide means for protecting gas pressure sensitive control instruments from damage by randomly recurring extraordinary gas pressures.

Another object is to provide a system for pumping sewage at a rate determined by the rate of sewage flow.

Another object is to provide means for preventing damage to machinery controlled by gas pressure sensitive control instruments when an extraordinary gas pressure would cause the control instruments to run the machinery in an unsafe manner.

A further object is to provide a system for protecting gas pressure sensitive control instruments from contact by corrosive gases.

Another object is to provide a system for protecting water rheostats from increases in gas pressure above a predetermined level.

A further object is to provide a sewage handling system including a bubbler tube whose outlet is immersed in the sewage, in which the bubbler tube will not become clogged by solid or semi-solid matter in the sewage.

Other objects and advantages of the invention will be apparent from the drawing, specification and claims and the scope of the invention will be pointed out in the claims.

Briefly stated, according to one aspect of the invention, a pressure sensitive control system employs means sensing the downstream pressure in a gas conduit and pressure dissipating means downstream thereof to guard against pressures exceeding a predetermined value.

In the drawing:

FIG. 1 is a schematic, partially cross-sectional, elevation of an embodiment of the invention; and FIG. 2 is an enlarged, schematic, cross-sectional view of the control means of the embodiment of FIG. 1.

Referring to the drawing, a liquid such as sewage 1 flows at varying rates through sewer line 2 into a wet well or tank 3, which has a vent 6. The sewage is pumped from tank 3 by a pump 7 mounted in an underground pumping station 9 having an inlet pipe 11, an outlet pipe 13, and an air vent 14. A shaft 15 connects pump 7 to a variable speed electric motor 17, which may, for example, be a wound rotor, induction type motor wherein changes in the resistance of the rotor circuit will cause inverse changes in the speed of the motor. A gas pressure sensitive control instrument, such as a conventional water rheostat 19, is used to control the resistance of the motor circuit.

Referring to FIG. 2, water rheostat 19 comprises an electrode chamber 21 and a reservoir chamber 23 separated by a dividing wall 25 spaced above bottom 27 so as to provide a passage 29 connecting chambers 21 and 23. A plurality of electrode plates 31 insulated from one another are supported in chamber 21 and are connected by conductor 33 to the rotor of motor 17. A liquid electrolyte 37 is contained within chambers 21 and 23. By increasing the gas pressure in chamber 23, electrolyte 37 can be forced into chamber 21 and thus cause the liquid level to rise. The pressure in chamber 23 is maintained proportional to the liquid head $h$ in tank 3 above a predetermined level L by a bubbler arrangement including a bubbler tube 39 extending into tank 3 and having its outlet positioned below level L a slight distance sufficient to compensate for pressure losses downstream thereof. Tube 39 is connected at junction 40 to any conventional source 41 of air pressure by conduit means 43 having a branch 45 connected to the top of the chamber 23. The pressure of source 41 is sufficiently high to bubble air into sewage 1 at any level reached by sewage in tank 3. Thus the pressure in tube 39 and chamber 23, and consequently the electrolyte level in chamber 21, will fluctuate with the sewage level in tank 3, and the sewage level will be proportional to the rate at which sewage flows into tank 3. The area of immersion of electrodes 31 will increase with the liquid level in tank 3 so as to cause the electrical resistance between electrodes 31 to decrease, thus effecting an increase in the speed of motor 17 and pump 7 as the sewage flow rate increases. Correspondingly, when the liquid level in tank 3 drops, the pressure in chamber 23 will drop causing electrolyte 37 to flow into the chamber 23 from chamber 21; as the electrolyte level in chamber 21 drops, less area of electrodes 31 will be immersed and this will increase the rotor resistance and effect a decrease in the speed of the motor 17 and pump 7. Therefore, the system causes pump 7 to pump sewage from tank 3 at a rate proportional to the rate at which sewage is flowing into the tank.

A gas pressure regulating valve 47 in conduit 45 between junction 40 and chamber 23 prevents the pressure in chamber 23 from exceeding a predetermined safe maximum value. Valve 47 senses downstream pressure and closes when such pressure is above the predetermined value.

For proper operation of the pressure responsive control system, pressure dissipating means, such as a very small leak orifice 48, is located in conduit 45 between valve 47 and chamber 23. Orifice 48 vents chamber 23 and the downstream side of valve 47 to the atmosphere for reasons given hereafter.

The hydrostatic head maintained in chamber 23 will be proportional to head $h$ in tank 3. At randomly recurring intervals, surges in the rate at which sewage is flowing into tank 3 could cause head $h$ to rise to such an extent that the corresponding hydrostatic head in chamber 23 would force all of the electrolyte 37 below dividing wall 25, thus causing air to bubble into chamber 21; this could damage electrodes 31, cause excessive evaporation of electrolyte 37, or force electrolyte 37 through vent 35.

To prevent such damage, gas pressure regulating valve 47 is set to close conduit 45 when the pressure in chamber 23 is at the maximum value at which water rheostat 19 or the controlled machinery can operate safely. When valve 47 is closed, the pressure in chamber 23 and hence the resistance of water rheostat 19 should be such that motor 19 is running at its maximum safe speed. The closing of conduit 45 by valve 47 does not interfere with the constant flow of compressed air from source 41 through bubbler tube 39. Thus air is constantly forced through bubbler tube 39 even though the pressure in chamber 23 is below the pressure in bubbler tube 39. Consequently sewage particles 55 can not clog bubbler tube 39, and corrosive gases 57 can not reach valve 47 or water rheostat 19.

Since extraordinary rises in liquid head $h$ in tank 3 are usually of temporary duration, water rheostat 19 must be able to sense when head $h$ has returned to a normal value. Leak orifice 48 makes this possible by allowing the air downstream of valve 47 to continually escape to the atmosphere. This causes valve 47 and orifice 48 to interact in the following manner: When the back pressure from bubbler tube 39 and consequently the pressure in chamber 23, rises above the predetermined maximum safe value, valve 47 closes. Since, valve 47 responds only to downstream pressures, it would remain permanently closed regardless of fluctuations in upstream pressure in bubbler tube 39 if leak orifice 48 were not present. Escape of air through leak orifice 48 causes the pressure in chamber 23 downstream of valve 47 to slowly decrease, whereupon valve 47 opens to raise the downstream pressure back to the predetermined maximum safe value. When the level of sewage in tank 3 stays constant, and the pressure in chamber 23 is at the predetermined maximum value, valve 47 will throttle to an open position which allows air to flow therethrough at the same rate as air is escaping from leak orifice 48. So long as the pressure in tube 45 is above the predetermined maximum value, fluctuations in liquid head $h$ will not affect the pressure in reservoir chamber 23 because gas pressure regulating valve 47 will adjust its opening to allow air to pass through it at the same rate as air escapes through leak orifice 48. When valve 47 is slightly open in a throttling condition during periods when the pressure is above the predetermined value, valve 47 and hence water rheostat 19 respond quickly when liquid head $h$ returns to the normal safe level. Thus the water rheostat 19 and the machinery it controls closely follow the fluctuations in head $h$ when the pressure in chamber 23 is below the predetermined value.

In a sewage pumping installation constructed in accord with the invention, the valve 47 was a ¾" size Fisher Regulator Type 4–600–2 valve set to hold the pressure in chamber 23 at a predetermined maximum safe value of 18 inches of water. The diameter of leak orifice 48 was 0.039 inch, and water rheostat 19 was a model B Flomatcher brand unit made by General Services Co. When running at a maximum safe speed of about 1100 r.p.m., motor 17 caused pump 7 to pump about 1050 gallons of sewage per minute.

It will be understood that while the form of the invention herein shown and described constitutes a preferred embodiment, it is not intended herein to illustrate all of the equivalent forms or ramifications thereof. It will also be understood that the words used are words of description rather than of limitation, and that various changes may be made without departure from the spirit or scope of the invention herein disclosed and it is aimed in the appended claims to cover all such changes as fall within the true spirit and scope of the invention.

What is claimed is:

1. In a system for producing a control signal proportional to the flow of a fluid comprising:
    (a) means producing gas pressure proportional to the flow of said fluid,
    (b) means producing a control signal proportional to said gas pressure, and
    (c) gas conduit means connecting said pressure producing means to said control signal producing means permitting gas to flow from said pressure producing means downstream to said signal producing means;
        the improvement in means for preventing the gas pressure reaching said signal producing means from exceeding a predetermined value, comprising:
(1) valve means sensing downstream pressure in said gas conduit means and throttling to close said conduit means when said downstream pressure reaches said predetermined value, and
(2) means continuously dissipating pressure in said conduit means between said signal producing means and said valve means when said downstream pressure reaches said predetermined value.

2. In a system for producing a control signal proportional to the flow of a liquid, comprising:
(a) means producing gas pressure proportional to the flow of said liquid by bubbling gas into said liquid,
(b) a water rheostat for producing a control signal proportional to said gas pressure, and
(c) gas conduit means connecting said gas bubbling means to said water rheostat and permitting gas to flow from said gas bubbling means downstream into said water rheostat;
the improvement in means for preventing the gas pressure reaching said water rheostat from exceeding a predetermined value, comprising:
(1) a downstream pressure sensing valve in said gas conduit means for throttling to close said conduit means when said downstream pressure reaches said predetermined value, and
(2) a leak orifice in said conduit means between said water rheostat and said valve continuously dissipating pressure when said downstream pressure reaches said predetermined value.

3. In a system for controlling fluid handling means in a manner proportional to the flow of the fluid, comprising:
(a) means producing gas pressure proportional to the flow of said fluid,
(b) means producing a control signal proportional to said gas pressure,
(c) means transmitting said signal to said fluid handling means so as to control its operation, and
(d) gas conduit means connecting said pressure producing means to said control signal producing means permitting gas to flow from said pressure producing means downstream to said signal producing means;
the improvement in means for preventing the gas pressure reaching said signal producing means from exceeding a predetermined value, comprising:
(1) valve means sensing downstream pressure in said gas conduit means and throttling to close said conduit means when said downstream pressure reaches said predetermined value, and
(2) means continuously dissipating pressure in said conduit means between said signal producing means and said valve means when said downstream pressure reaches said predetermined value.

4. In a system for pumping sewage at a rate proportional to the flow of the sewage, comprising:
(a) means for pumping said sewage,
(b) means producing gas pressure proportional to the flow of said sewage,
(c) means producing a control signal proportional to said gas pressure,
(d) means transmitting said signal to said sewage pumping means so as to control its operation, and
(e) gas conduit means connecting said pressure producing means to said control signal producing means permitting gas to flow from said pressure producing means downstream to said signal producing means;
the improvement in means for preventing the gas pressure reaching said signal producing means from exceeding a predetermined value, comprising:
(1) valve means sensing downstream pressure in said gas conduit means and throttling to close said conduit means when said downstream pressure reaches said predetermined value, and
(2) means continuously dissipating pressure in said conduit means between said signal producing means and said valve means when said downstream pressure reaches said predetermined value.

5. In a system for pumping sewage at a rate proportional to the flow of the sewage, comprising:
(a) a tank receiving said sewage,
(b) means for pumping said sewage out of said tank,
(c) means producing gas pressure proportional to the level of said sewage in said tank,
(d) means producing a control signal proportional to said gas pressure,
(e) means transmitting said signal to said sewage pumping means so as to control its operation, and
(f) gas conduit means connecting said pressure producing means to said control signal producing means permitting gas to flow from said pressure producing means downstream to said signal producing means;
the improvement in means for preventing the gas pressure reaching said signal producing means from exceeding a predetermined value, comprising:
(1) a downstream pressure sensing valve in said gas conduit means for throttling to close said conduit means when said downstream pressure reaches said predetermined value, and
(2) a leak orifice continually dissipating pressure in said conduit means between said signal producing means and said downstream pressure sensing valve.

6. In a system for pumping sewage at a rate proportional to the flow of the sewage, comprising:
(a) a tank receiving said sewage,
(b) an electrically controlled pump having its inlet connected to said tank,
(c) a gas bubbler having a tube immersed in the sewage in said tank for producing gas pressure proportional to the level of sewage in said tank,
(d) a water rheostat producing an electrical signal proportional to said gas pressure,
(e) means conducting said electrical signal so as to control the operation of said pump, and
(f) a gas conduit connecting said gas bubbler to said water rheostat and permitting gas to flow from said gas bubbler downstream into said water rheotat;
the improvement preventing the gas pressure reaching said water rheostat from exceeding a predetermined value, comprising:
(1) valve means sensing downstream pressure in said gas conduit and throttling to close said gas conduit when said downstream pressure reaches said predetermined value, and
(2) means continuously dissipating pressure in said gas conduit between said water rheostat and said valve means when said downstream pressure reaches said predetermined value.

7. In a system for pumping sewage at a rate proportional to the flow of the sewage, comprising:
(a) a tank receiving said sewage,
(b) an electrically controlled pump having its inlet connected to said tank, (c) a gas bubbler having a tube immersed in the sewage in said tank for producing gas pressure proportional to the level of sewage in said tank,
(d) a water rheostat producing an electrical signal proportional to said gas pressure,
(e) means conducting said electrical signal so as to control the operation of said pump, and
(f) a gas conduit connecting said gas bubbler to said water rheostat and permitting gas to flow from said gas bubbler downstream into said water rheostat; the improvement preventing the gas pressure reaching said water rheostat from exceeding a predetermined value, comprising:
  (1) a downstream pressure sensing valve in said gas conduit for throttling to close said conduit when said downstream pressure reaches said predetermined value, and
  (2) a leak orifice in said conduit between said water rheostat and said downstream pressure sensing valve continuously venting said conduit to the atmosphere.

8. In a system for pumping sewage at a rate proportional to the flow of the sewage, comprising:
(a) a tank receiving said sewage,
(b) an electric motor the speed of which is inversely proportional to the resistance of its rotor circuit,
(c) a pump driven by said motor and having its inlet connected to said tank,
(d) a gas bubbler having a tube immersed in the sewage in said tank for producing gas pressure proportional to the level of sewage in said tank,
(e) a water rheostat the resistance of which is reduced as said gas pressure increases,
(f) means connecting said resistance into said rotor circuit, whereby the speed of said motor is inversely proportional to said resistance, and
(g) a gas conduit connecting said gas bubbler to said water rheostat and permitting gas to flow from said gas bubbler downstream into said water rheostat; the improvement preventing the gas pressure reaching said water rheostat from exceeding a predetermined value, comprising:
  (1) a downstream pressure sensing valve in said gas conduit for throttling to close said conduit when said downstream pressure reaches said predetermined value, and
  (2) a leak orifice continually dissipating pressure in said conduit between said water rheostat and said downstream pressure sensing valve.

9. In a control system containing a fluid pressure sensitive control instrument, means for stabilizing the response of said control instrument when the fluid pressure reaches a predetermined value while allowing said fluid pressure sensitive control instrument to follow changes in fluid pressure below said predetermined value, comprising:
(a) conduit means communicating said instrument with a source of said fluid pressure,
(b) fluid pressure regulating valve means in said conduit means for throttling closed said conduit means when the pressure in said conduit means downstream thereof reaches said predetermined value, and
(c) fluid pressure dissipating means in said conduit means downstream of said fluid pressure regulating means and upstream of said instrument for continuously reducing the pressure downstream of said fluid pressure regulating means so that said fluid pressure regulating means can substantially always remain at least slightly open.

10. In a liquid control system containing a gas pressure sensitive control instrument which responds to the back pressure from a gas forced into said liquid by a bubbler, means for stabilizing the response of said instrument when the back pressure due to the liquid level reaches a predetermined value, while simultaneously preventing the deleterious entrance of said liquid and fumes from said liquid into said bubbler; said means comprising:
(a) conduit means communicating said instrument with said bubbler,
(b) gas pressure regulating valve means in said conduit means for throttling closed said conduit means when the gas pressure downstream thereof reaches a predetermined value,
(c) gas pressure dissipating means in said conduit means downstream of said gas pressure regulating means and upstream of said instrument for continually reducing the pressure downstream of said gas pressure regulating means so that said gas pressure regulator can remain slightly open.

11. In a liquid control system containing a gas pressure sensitive control instrument which responds to the back pressure from a gas forced into said liquid from a bubbler, means for stabilizing the response of said instrument when the back pressure due to the liquid level reaches a predetermined value, while simultaneously preventing the deleterious entrance of said liquid and fumes from said liquid into said bubbler, said means comprising:
(a) conduit means located in a region of atmospheric pressure for communicating said instrument with said bubbler,
(b) gas pressure regulating valve means in said conduit means for throttling closed said conduit means when the gas pressure downstream thereof reaches a predetermined value,
(c) gas pressure dissipating means in said conduit means downstream of said gas pressure regulating means and upstream of said instrument, comprising:
  means venting said conduit means to said region of atmospheric pressure when gas pressure reaches said predetermined value for reducing said gas pressure downstream of said gas pressure regulator so that the gas pressure regulator can remain slightly open and can allow said instrument to respond to back pressure in said conduit which is less than said predetermined value.

References Cited by the Examiner
UNITED STATES PATENTS

| 2,380,459 | 7/45 | Niesemann | 137—505.41 X |
| 3,021,789 | 2/62 | Ryden | 103—35 |

LAURENCE V. EFNER, *Primary Examiner.*